Oct. 2, 1928.

B. H. SMITH 1,685,961

FREQUENCY REGULATOR

Filed Jan. 31, 1921

WITNESSES:

INVENTOR
Benjamin H. Smith
BY
ATTORNEY

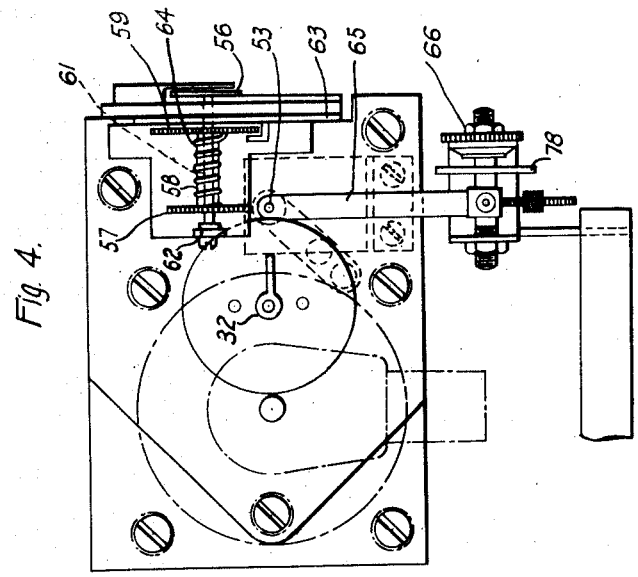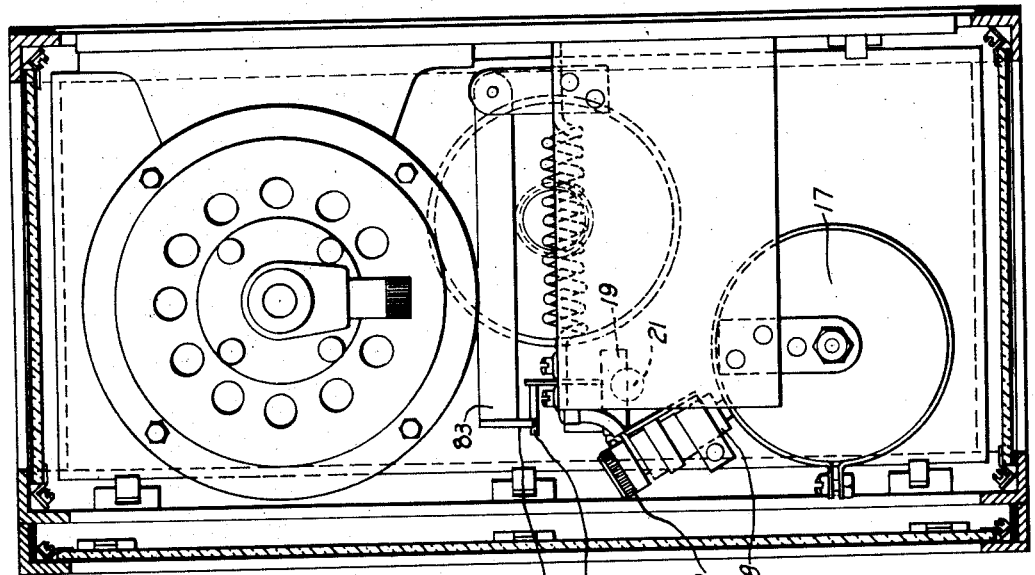

Oct. 2, 1928.
B. H. SMITH
1,685,961
FREQUENCY REGULATOR
Filed Jan. 31, 1921
4 Sheets-Sheet 4
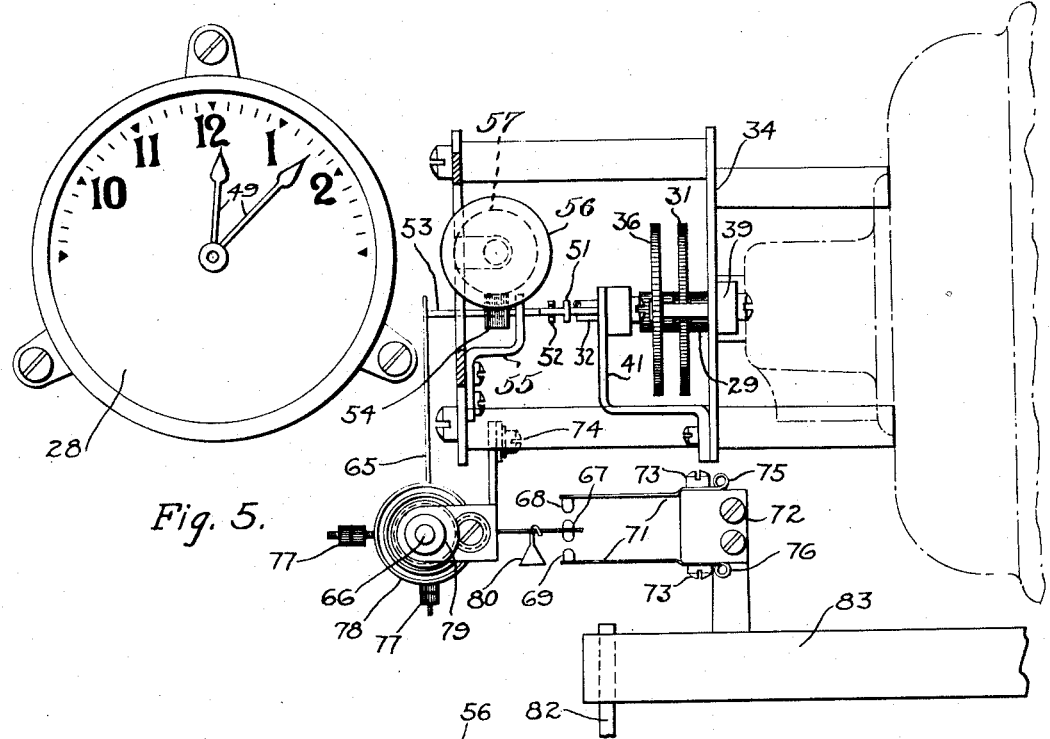
Fig. 5.
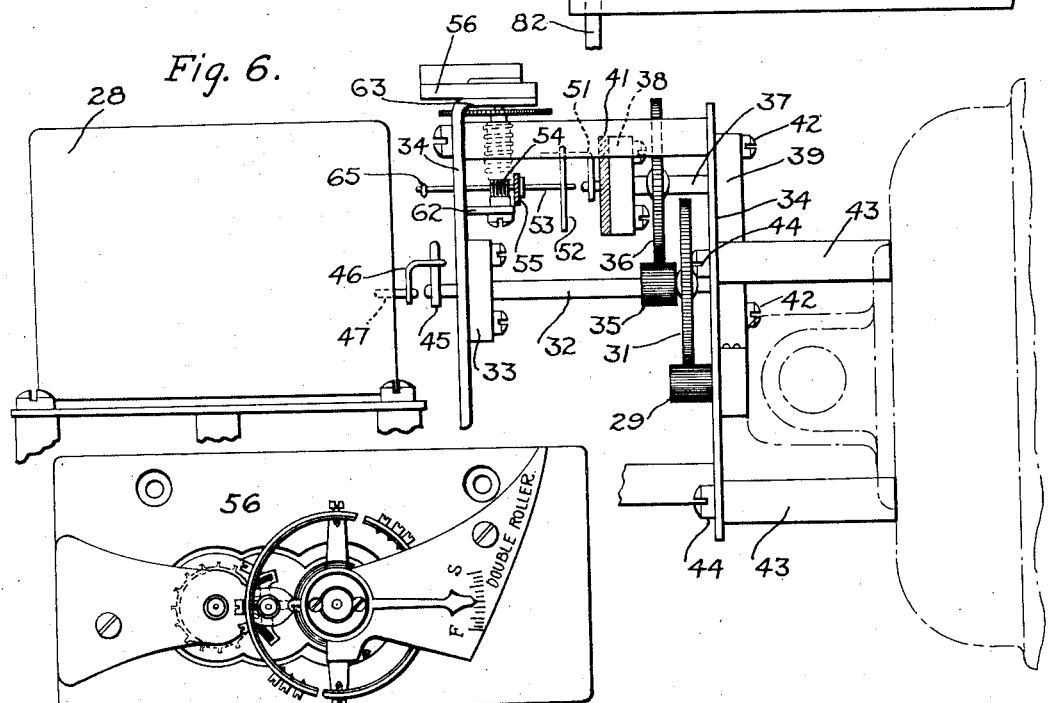
Fig. 6.
Fig. 7.
WITNESSES:
T. H. Crock.
M. Theodore Simmons.
INVENTOR
Benjamin H. Smith.
BY
Wesley G. Carr
ATTORNEY Patented Oct. 2, 1928.

1,685,961

UNITED STATES PATENT OFFICE.

BENJAMIN H. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

FREQUENCY REGULATOR.

Application filed January 31, 1921. Serial No. 441,216.

My invention relates to an electrical frequency-regulator system and has special relation to a time-clock system.

One object of my invention is to simplify and improve the apparatus and system heretofore utilized to distribute correct time by means of synchronous motor-driven clocks energized from a commercial alternating-current supply.

Another object of my invention is to provide an improved regulator mechanism in a system of the above-indicated character.

Another object of my invention is to provide an anti-hunting device for said regulator.

My invention is shown as applied to a system which comprises a motor-generator set and a synchronous motor in circuit with said generator that is adapted to receive a frequency which corresponds to the frequency of said generator. The synchronous motor is adapted to be connected to a time clock that will give an indication of the frequency of the synchronous motor. The system also includes a master clock, or escapement, with which said time clock and the synchronous motor may be compared. This master escapement operates at constant speed and is actuated by said synchronous motor. Between the clocks is located a differential mechanism adapted to operate a switch lever that controls the movement of a pilot motor-operated rheostat to vary the resistance in circuit with the motor of the motor-generator set. Thereby, the frequency of the supply circuit of the cynchronous motor will be regulated to maintain it substantially constant.

Referring to the drawings,

Figs. 2 and 3 are views in front and in side elevation, respectively, of the panel-board containing the regulating mechanism;

Fig. 4 is a view in side elevation of the regulator mechanism;

Fig. 5 is another view in side elevation of the regulator mechanism;

Fig. 6 is a bottom view of the regulator mechanism of Figs. 4 and 5, with the control mechanism omitted, and Fig. 7 is a detail view of the master escapement.

Figure 1:
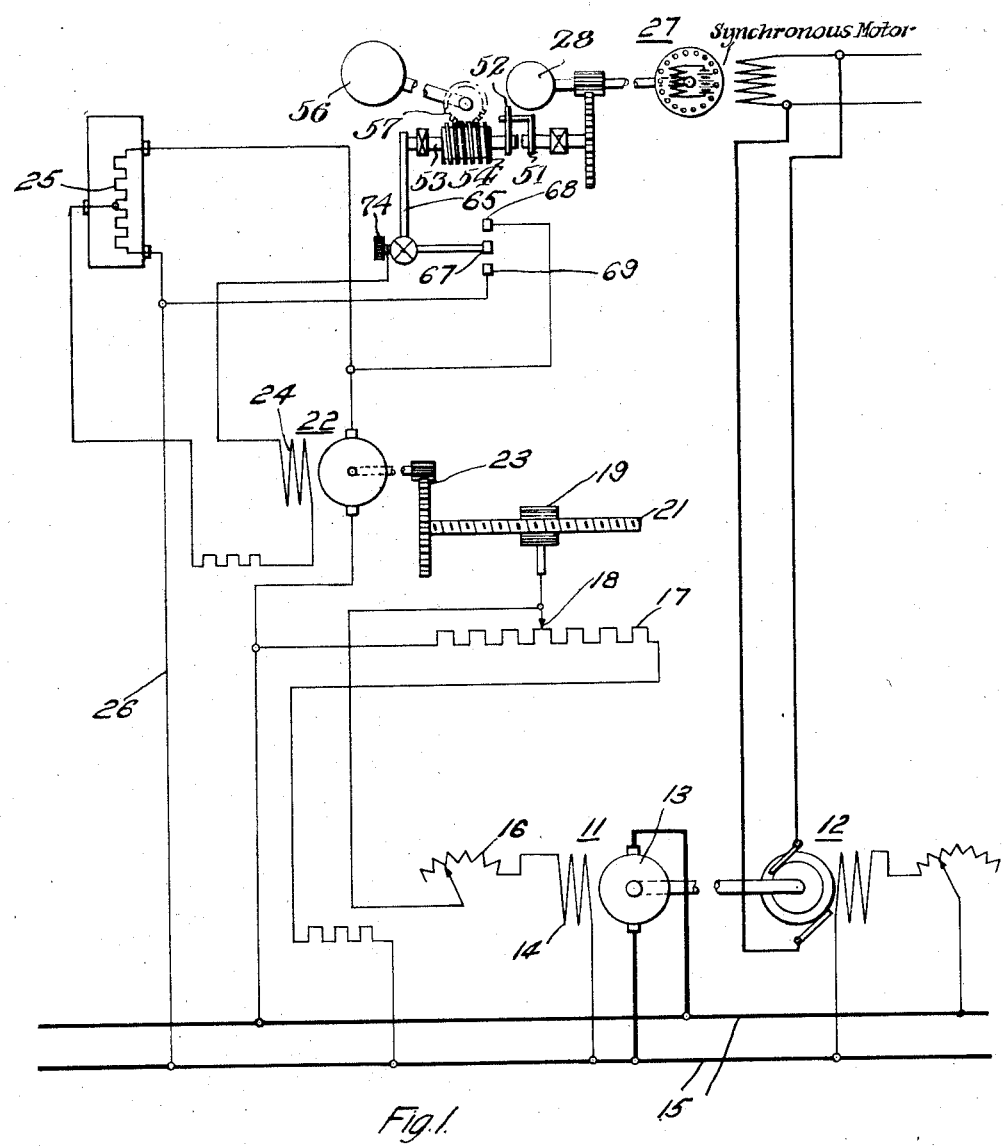
Figure 1 is a diagrammatic illustration of the circuits and apparatus embodied in my invention.

Referring to Fig. 1, the illustrated motor-generator set comprises a motor 11 and a generator 12. The motor comprises an armature 13 and a shunt field-magnet winding 14, and is adapted to be energized from conductors 15. The field-magnet winding 14 has a hand rheostat 16 in circuit therewith, and also has, in circuit therewith, a rheostat 17 with which brush 18 is adapted to co-operate to vary the resistance value of the shunt field. Brush 18 is carried by a mounting 19 which works along a worm shaft 21. Worm shaft 21 is rotated by a reversible pilot motor 22, through suitable gearing 23, as illustrated. The field-magnet winding 24 of the pilot motor is connected to the central point of a three-point resistor 25 which is directly connected to one of the supply conductors 15 through conductor 26.

The generator 12 is adapted to supply a substantially constant frequency to a synchronous motor 27, which is electrically connected thereto.

The details of the control mechanism will be best understood by reference to Figs. 2 to 6, inclusive.

The synchronous motor has a time-indicating clock 28 connected thereto to be operated in accordance with the applied frequency of said motor. This result is accomplished as follows:—

A pinion or small gear-wheel 29 is mounted directly upon the shaft of the synchronous motor and meshes with a spur gear-wheel 31 that is secured to shaft 32, the shaft being mounted, at one end, in a bearing 33 and, at the other end, in a frame 34. Also secured upon the shaft 32 is a pinion 35 which meshes with a spur gear-wheel 36, mounted upon the shaft 37. The shaft 37 is journaled, at its opposite ends, in bearings 38 and 39. The bearing 38 is secured to the frame 34 by means of a bracket 41. Bearing 39 is secured to the frame 34 by means of screws 42, as illustrated in Figs. 5 and 6. Frame 34 is secured to the frame of the motor 27 by means of studs 43 and screws 44.

Shaft 32 carries, on the outer end thereof, a pin 45 which is adapted to engage a crank arm 46 that is secured to the shaft 47, which drives the hands 49 of a clock mechanism 28. This mechanism will not be further described because it may be of any of the now well-known constructions.

Shaft 37 carries, on the outer end thereof, a crank arm 51 that engages a pin 52, carried by a shaft 53, on which is a worm 54. Shaft 53 has its opposite ends mounted in bracket 55 and in one side of the frame 34, respectively. This shaft 53 is adapted for lateral displacement in its bearings, as will be hereinafter described.

A master clock or escapement, with which the synchronous time clock may be compared and which is similar to an ordinary clock escapement, will be herein designated by the reference character 56.

Located between the motor-driven clock mechanism and the constant-speed master escapement 56 is a differential mechanism, which comprises a worm gear 57, mounted upon a hollow sleeve 58. The worm gear 57 meshes with the worm 54. A gear wheel 59 is secured to a shaft 61 which extends within the sleeve 58. Shaft 61 is journaled in a support 62 and an extension 63 of the frame 34. Gear wheel 59 is a part of the train of gears constituting the master escapement. It is yieldably connected to the worm gear 57 by means of a spring 64. Thus, the connection between the worm 54, driven by the synchronous motor 27, and the gear-wheel 59 supplies the power for driving the master escapement. The method of maintaining this power constant, regardless of variations in the speed of the synchronous motor, will be hereinafter described in conjunction with the control mechanism.

A portion of the control mechanism that is in circuit with the pilot motor 22 of the motor-operated rheostat, comprises bell-crank lever 65, pivoted at 66. At one end, this lever bears against worm shaft 53, as clearly shown in Fig. 4. At its opposite end, this lever carries contact terminal 67, (Fig. 5), which is adapted to engage opposite terminals 68 and 69, mounted upon the resilient arms 71. Arms 71 are secured to an insulator block 72 by means of screws 73. The block 72 is supported by a bar 83, for a purpose which will be described in conjunction with the anti-hunting device.

The lever 65 has a binding post 74 connected thereto. As illustrated in Fig. 1, this post is in circuit with the field-magnet winding 24 of the pilot motor 22. A binding post 75, secured to the resilient arm carrying contact terminal 68, is in circuit with one terminal of the three-point resistor 25 and also in circuit with the armature of the pilot motor 22. A binding post 76, connected to resilient arm 71 carrying contact terminal 69, is in circuit with another of the terminals of the three-point resistor 25 and also with one of the supply conductors 15. Hence, depending upon which of the terminals 68 and 69 is engaged by the co-operating terminal 67, the field 24 of pilot motor 22 will be energized, in the one or the other direction, to operate the pilot motor 22 in a forward or reverse manner, to thereby move the brush 18 in the one or the other direction, in accordance with the correction to be made.

Figure 2:
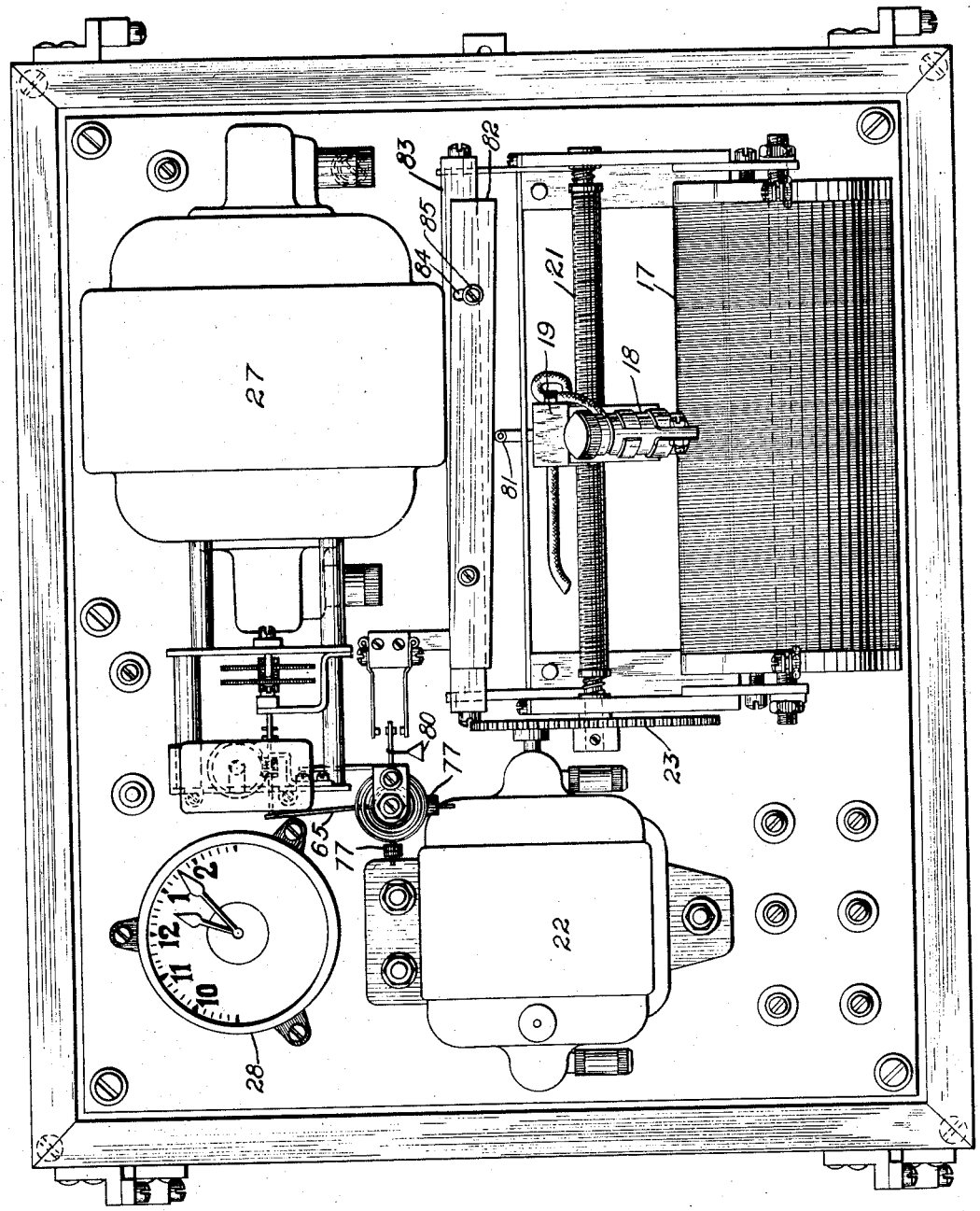

In order to maintain the speed of the master escapement constant, adjustable weights 77 are attached to the arms of the bell-crank lever 65, as best shown in Fig. 5. Additional torque may be applied to the upright arm 65 of the bell-crank lever by increasing the tension upon the spring 78, which is secured to the shaft 66, this shaft constituting the fulcrum for the switch lever 65. This adjustment of the tension spring 78 may be accomplished in any convenient manner, as by the gear mechanism 79, best shown in Fig. 5. In addition, a weight 80 may be attached to one of the arms of bell-crank lever 65, as shown in Figs. 2 and 5. Thus, a constant pressure is exerted upon the worm shaft 53, just sufficient to counterbalance the tendency toward axial or lateral displacement of the shaft 53, as it is rotated by motor 27. Since, in normal operation, the shaft 53 cannot be displaced, the driving power thereon will be transmitted to worm wheel 57, and therethrough to the master escapement 56, so that the constant pressure on the shaft 53 will maintain the speed of the master escapement constant. One adjustment of the master escapement may be accomplished by adjusting the weights 77.

From the foregoing description, it will be apparent that any variations occurring between the synchronous motor-driven clock 28 and the master escapement 56 will be recorded by a torsional movement of the differential spring 64. As the worm 54 cannot be thereby rotated faster or slower, such a variation will become evident only in a displacement of the worm shaft 53. Such a displacement of the worm shaft 53 will correspondingly move the arm of the bell-crank lever 65, which bears against it. This condition will cause the contact terminal 67 to be moved into engagement with terminal 68 or terminal 69, depending upon the direction of movement of the lever 65. This action will effect a corresponding movement of the pilot motor 22, to regulate the associated rheostat to increase or decrease the resistance of the prime mover or motor 11.

Referring to the illustration in Fig. 1, if the synchronous motor 27 is being supplied with too high a frequency, the worm shaft 53 will be displaced toward the left to thereby effect engagement of terminals 67 and 68. This action will energize the shunt field 24 to rotate the armature of pilot motor 22 to rotate the worm shaft 21 to move the brush 18 toward the left, as shown in Fig. 1. This will increase the strength of the shunt field 14 of the motor 11 to thereby decrease its driving speed for the generator 12, and, hence, to lower the frequency supplied to the synchronous motor 27. Without further detailed description, it will be apparent that, if a lower frequency is supplied to the synchronous motor 27, the shunt field 24 will be energized in the opposite direction to effect the opposite correction.

In adidtion to any other means which may be provided for adjusting the time indication of the synchronous motor clock 28, the above-described mechanism may be operated to permit the clock 28 to run ahead of the master escapement. This result may be accomplished by the manual rotation of the gear wheel 23 to move the brush 18 toward the left in Fig. 2, to increase the excitation of the prime mover or motor 11. By holding the brush 18 in this position, the motor 27 will speed up, with the result that the worm 54 will be displaced to the left in accordance with the normal operation of the regulating mechanism, as described above. It will be apparent that the worm will soon be out of effective engagement with the gear-wheel 57, where it will be held by the arm 65. So long as the brush 18 is held in this position, the worm will continue to slip, which action will slow down or stop the movement of the master escapement and permit the synchronous motor-driven clock to pick up.

Referring to Figs. 2 and 3, an anti-hunting device for the regulating apparatus is illustrated. The mounting 19 for the brush 18 has a roller 81 connected thereto. The roller 81 engages a longitudinal bar 82 which is secured to a pivoted support 83. Bar 82 is adapted to be adjustable upon the support 83 by means of the slot 84 and the screw 85 engaging therewith. It will be apparent that bar 82, by force of its own weight, exerts a pressure upon the roller 81. This pressure will be sufficient to prevent overtravel of the brush 18.

A further provision is made for preventing too rapid decrease of the speed of the prime mover by inclining the bar 82 so that, as the brush 18 moves toward the low-resistance side of the coil 17, it will have to raise the weight of the support 83 from its normal position of rest.

It will also be noted that contact members 68 and 69 are mounted upon the bar 83. As the roller 81 traverses the bar 82, the bar 83 is raised or lowered, and this movement prematurely separates the contact members 67 and 68 or 67 and 69, as the case may be, to permit the inertia of the moving parts to complete the regulation without overtravel.

The above invention has been described as applied to the regulation of the frequency of a time-clock system. Obviously, the same principles may be adapted for regulation of the frequency in other systems. Also, the same principles may be adapted for use in controlling motors and motor systems rather than regulating the frequency of a supply circuit.

Modifications in the system and arrangement and location of parts may be made within the spirit and scope of my invention, and such modifications are intended to be covered by the appended claims.

I claim as my invention:—

1. In combination with an alternating-current circuit, of a synchronous motor operatively connected to said circuit, master escapement means actuated by said motor, a differential device between said motor and said escapement means, and control means adapted to be operated in accordance with the movements of said differential device.

2. In a system of frequency regulation, the combination with a motor, the frequency of the circuit of which is to be regulated, a differential, means acting upon one side of said differential in accordance with the rotation of said motor, and a constant-speed means acting upon the other side of said differential that is also actuated by said motor, of control means actuated in accordance with the movements of said differential to maintain the frequency of said motor circuit substantially constant.

3. In combination with a prime mover, a generator driven thereby, a synchronous motor connected to the generator and a constant-speed source actuated by said motor, of a control mechanism located between said motor and said source for controlling said prime mover.

4. In a system of frequency regulation, the combination with a prime mover, a generator driven thereby, a synchronous motor connected to the generator and a constant-speed source actuated by said motor, of a control mechanism located between said motor and said source for controlling said prime mover.

5. The combination with an alternating-current circuit having a motor connected thereto, of a device driven directly by said motor, and a master escapement element with which said device may be compared, said element being also driven by said motor.

6. In a system of frequency regulation, the combination with a supply circuit, of means operated in accordance with the frequency of said circuit, and master means with which said first-mentioned means may be compared to effect regulation, said master means being also driven by said first mentioned means.

7. In a system of frequency regulation, the combination with a motor, the applied frequency of which is to be regulated, of a worm shaft driven by said motor, bearings therefor in which said shaft is adapted to be axially movable, a master escapement driven by said worm, a differential mechanism located between said motor and said master escapement and adapted to displace said worm shaft in accordance with its operation, and control mechanism operated by the displacement of said worm shaft to vary the frequency of said motor circuit.

8. In an electrical system, the combination with a motor, of a worm shaft driven by said motor, bearings therefor in which said shaft is adapted to be axially movable, a master escapement driven by said worm, a differential mechanism located between said motor and said master escapement adapted to displace said worm shaft in accordance with its operation, and control mechanism operated by the displacement of said worm shaft to vary the frequency of the circuit of said motor.

9. In an electrical system, the combination with a prime mover, a generator driven thereby, a motor connected in circuit with said generator, master means driven by said motor, and a differential mechanism located between said means and said motor, of control mechanism operated in accordance with the movements of said differential mechanism to control said prime mover.

10. A frequency regulator for a supply circuit comprising means operated in accordance with the frequency of said circuit, a constant speed means also actuated from said circuit, and a switch mechanism governed by the difference in operation of said means to maintain the frequency of said circuit substantially constant.

11. The combination with a prime mover, a generator driven thereby, a synchronous motor connected to the generator, and a constant-speed source actuated by said motor, of a frequency regulator for said prime mover comprising means located between said motor and said constant-speed source.

12. The combination with a prime mover, a generator driven thereby, a synchronous motor connected to the generator, and a constant-speed source actuated by said motor, of a frequency regulator for said prime mover comprising means located between said motor and said constant-speed source, and a switch mechanism operated thereby.

13. In an electric system, the combination with a motor, a coil rheostat in circuit therewith, a brush co-operating therewith, a worm shaft upon which said brush is mounted, a roller carried by said brush, a pivotally mounted inclined bar with which said roller co-operates, and a pilot motor for rotating said worm shaft, of control mechanism for said pilot motor operated in accordance with variations in the frequency of the supply circuit of said motor.

14. In combination with a motor and a clock mechanism operated thereby, a worm shaft driven by said motor, bearings therefor in which said shaft is adapted to be axially movable, a master escapement driven by said worm, a differential mechanism located between said motor and said master escapement and adapted to displace said worm shaft in accordance with its operation, control mechanism operated by the displacement of said worm shaft to vary the frequency of said motor, and means for permitting a slipping action of said worm shaft whereby the motor-driven clock mechanism may be adjusted to coincide with the master escapement movement.

15. In an electrical system, the combination with an alternating-current circuit, and a motor connected thereto, of regulator means therefor comprising a differential means adapted to have both portions thereof actuated by said motor whereby the said regulator means will inherently be maintained inoperative when said motor is inactive.

16. In an electrical system, the combination with a dynamo-electric machine, of regulator means therefor comprising a differential means having one portion thereof driven by said machine, a spring controlled by said machine, and a second portion thereof operated by said spring, and means actuated by said differential means for controlling the operation of said dynamo-electric machine.

17. A regulator system comprising a synchronous motor, a differential having one portion thereof driven by said motor, a spring controlled by said motor and a second portion operated by said spring, and means actuated by said differential for controlling the frequency of the circuit to said motor.

18. In an electrical system, the combination with a motor and a worm and gear wheel operated by said motor, a shaft upon which said gear wheel is mounted, a second gear wheel, a hollow sleeve surrounding said shaft upon which said second gear wheel is mounted, and a spring-driving connection between said gear wheels, of regulator means actuated by said mechanism.

19. In an electrical system, the combination with a motor and a differential device comprising a worm and gear wheel, a shaft upon which said wheel is mounted, a second gear wheel, a hollow sleeve surrounding said gear wheel, upon which said second gear wheel is mounted, and a spring-driving connection between said gear wheels, of means actuated in accordance with the operation of said differential to control the operation of said motor, said means comprising a plurality of switches selectively energized by said differential, a motor-operated rheostat controlled by said switches and anti-hunting means therefor.

20. In an electrical system, the combination with a differential device comprising a worm and gear wheel, a second gear wheel, and a yieldable connection between said gear wheels, of means comprising a plurality of switches selectively energized by said differential, a motor-operated rheostat controlled by said switches and anti-hunting means therefor.

21. In an electrical system, the combination with a differential comprising a worm and a gear wheel a shaft upon which said wheel is mounted, a second gear wheel, a hollow sleeve surrounding said shaft upon which said second gear wheel is mounted, and a yieldable connection between said gear wheels, of control means actuated by said differential comprising a contact arm, a pair of contact members in co-operative relation therewith, a motor having the direction of rotation thereof controlled by said contact mechanism, a rheostat operated by said motor, and means actuated simultaneously with said rheostat and adapted to separate said contact members just prior to the obtaining of normal conditions to prevent hunting action.

22. In an electrical system, the combination with a differential comprising a worm and a gear wheel, a second gear wheel, and a yieldable connection between said gear wheels, of control means actuated by said differential comprising a contact arm, a pair of contact members mounted in co-operative relation therewith, a bracket supporting said pair of contact members, a motor controlled by the operation of said contact mechanism, a rheostat having a contact arm operated by said motor, means actuated simultaneously with said arm and adapted to move said bracket to separate said contact members just prior to the obtaining of normal conditions to prevent hunting action.

23. In an electrical system, the combination with a prime mover, a generator driven thereby, a synchronous motor connected to said generator, and differential mechanism comprising a worm shaft operated by said motor, a gear wheel co-operating with said worm shaft, a shaft upon which said wheel is mounted, a second gear wheel, a hollow sleeve surrounding said shaft and upon which said second gear wheel is mounted, and a yieldable connection between said gear wheels, of means governed by said differential and adapted to maintain predetermined conditions upon said machines.

24. In an electrical system, the combination with a dynamo-electric machine, of a worm shaft, a gear wheel co-operating therewith, bearings for said shaft in which the same is adapted to be axially movable, a second gear wheel, and a spring-driving connection between said gear wheels, and means actuated in accordance with the operation of said mechanism to control the operation of said dynamo-electric machine, said means comprising a plurality of switches selectively energized by said mechanism, a motor-operated rheostat controlled by said switches and anti-hunting means therefor.

25. In a system of regulation, the combination with a power circuit, of means operated in accordance with the frequency of said circuit, and regulator means therefor comprising a differential adapted to have both portions thereof actuated by said first-mentioned means, whereby the said regulator means will be maintained inoperative whenever said first-mentioned means is inoperative.

26. In an electrical system, the combination with a motor-generator set, a synchronous motor in circuit with said generator, a differential mechanism operated by said motor and comprising a worm shaft, a gear wheel co-operating therewith, a second gear wheel, and a spring connection between said gear wheels, of control means actuated by said differential comprising a contact arm, a pair of contact members mounted in co-operative relation therewith, a motor the direction of rotation of which is controlled by said contact mechanism, a rheostat operated by said motor, and means actuated simultaneously with said rheostat and adapted to separate said contact members just prior to the obtaining of normal conditions in said system to prevent hunting action.

27. A frequency regulator for a power circuit comprising a worm shaft, bearings therefor, actuating means for said shaft, a gear wheel co-operating with said worm shaft, a second gear wheel, and a spring driving connection between said gear wheels, said second gear wheel being adapted to exert a constant force whereby said shaft will be displaced in accordance with the differential action of said gear wheels, and means actuated by the displacement of said shaft.

28. In a system of frequency regulation, the combination with a supply circuit, of means operated in accordance with the frequency of said circuit, and master means with which said first-mentioned means may be compared to effect automatic regulation, said master means being also driven by said first-mentioned means.

29. In a system of frequency regulation, the combination with an alternating-current circuit, and a generator therefor, of a motor operatively connected to said circuit, an escapement mechanism actuated by the motor, means also actuated by the motor for controlling the frequency of the generator to cause it to be maintained substantially constant, and anti-hunting means therefor.

30. In a system of frequency regulation, a power circuit, means operated in accordance with the frequency of said circuit, a second means actuated from said power circuit, control means governed by the difference in operation of said means to maintain the frequency of said circuit substantially constant, and anti-hunting means therefor.

31. In a system of frequency regulation, the combination with a prime mover, a generator driven thereby, a synchronous motor connected to the generator and a constant-speed source actuated by said motor, of a control mechanism located between said motor and said source for controlling said prime mover, and anti-hunting means therefor.

32. A frequency regulator for a supply circuit comprising means operated in accordance with the frequency of said circuit, a constant-speed means also actuated from said circuit, a switch mechanism governed by the difference in operation of said means to maintain the frequency of said circuit substantially constant, and anti-hunting means therefor.

33. A frequency regulator for a synchronous motor comprising a time element actuated directly by said motor, a master escapement mechanism with which the operation of said time element may be compared, said master escapement being also actuated by said motor, and anti-hunting means therefor.

34. In an electric system, the combination with a motor, a coil rheostat in circuit therewith, a brush co-operating therewith, a worm shaft upon which said brush is mounted, a roller carried by said brush, a pivotally-mounted inclined bar with which said roller co-operates, contact mechanism having a portion thereof carried by said bar, and a pilot motor for rotating said worm shaft, of control mechanism for said pilot motor operated in accordance with variations in the frequency of the supply circuit of said motor and adapted to actuate said contact mechanism.

35. In an electrical-clock system, the combination with a motor-generator set, a motor-operated rheostat in circuit with said motor, a synchronous motor in circuit with said generator, a master escapement with which said motor may be compared and also actuated by said motor, and a differential between said motor and said escapement, of means governed by the operation of said differential to regulate said synchronous motor, and means adapted to prevent hunting action.

36. In an electrical system, the combination with a dynamo-electric machine, of regulator means therefor comprising a differential means adapted to have both portions thereof actuated by said dynamo-electric machine, and means adapted to prevent hunting action.

37. In combination, a single source of motive power, means having a natural period of oscillation operated by power derived from said source of motive power, an element driven mechanically by power communicated thereto from said source of motive power, and means controlled jointly by said source of motive power and said first recited means for controlling the speed of the driven element.

38. In combination, a single source of motive power, means having a natural period of oscillation operated by power derived from said source of motive power, an element driven mechanically by power communicated thereto from said source of motive power, and means common to said source of motive power and said first-mentioned means and controlled thereby for causing said element to be driven within predetermined speed limits.

39. A device for controlling the speed of a member driven mechanically by a motor, the speed of which is variable, including means acting to vary the current delivered to said motor for effecting changes in the speed thereof, means having a natural period of motion and operating at a constant rate of power derived from said motor, and means controlled conjointly by said motor and said second recited means for rendering said first-mentioned means effective for changes in speed of said motor to maintain the speed of said member constant.

40. In combination, a motor, a driven element directly and mechanically connected to said motor, means for regulating the speed of said motor whereby said element is driven at a constant and uniform speed comprising a speed control means operative directly on said motor, a balance and escapement mechanism operated by power derived from the said motor, and means common to said motor and said balance and escapement mechanism and controlled by variations in the speed of said motor from the rate of said balance and escapement mechanism for operating said speed control means.

41. In combination, a motor, a driven element directly and mechanically connected to said motor, means for regulating the speed of said motor whereby said element is driven at a constant and uniform speed comprising a body capable of harmonic motion operated by power derived from said motor, means common to said motor and said body and rotated due to variations in the speed thereof from the rate of said body for operating said speed control means.

In testimony whereof I have hereunto subscribed my name this 26th day of January, 1921.

BENJAMIN H. SMITH.